Patented Oct. 20, 1953

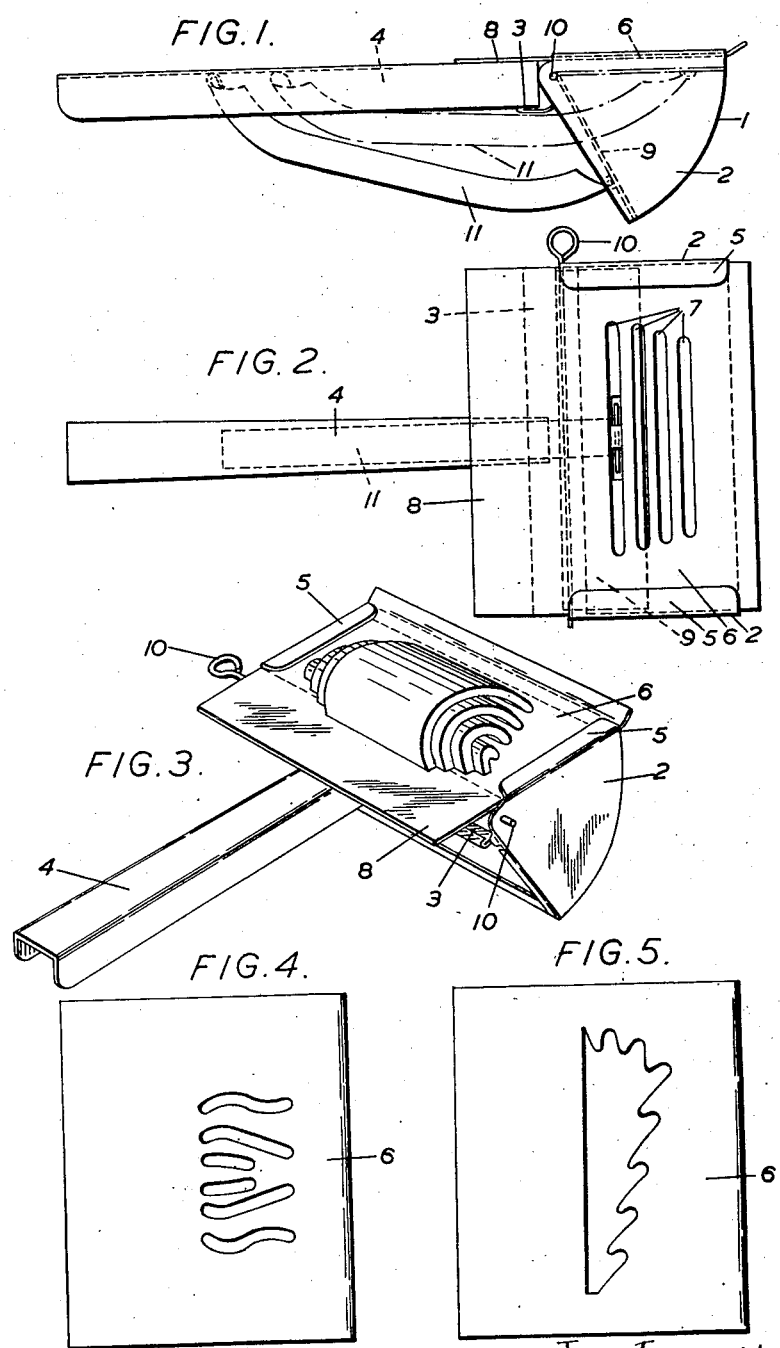

2,655,877

UNITED STATES PATENT OFFICE 2,655,877

APPARATUS FOR FORMING SHAPED OBJECTS FROM PLASTIC MATERIAL

Jean Joan Wilson, Bournemouth, England

Application April 6, 1951, Serial No. 219,707
In Great Britain June 14, 1950

6 Claims. (Cl. 107—47)

The present invention relates to apparatus for forming shaped objects from plastic material and has for its object to provide apparatus for this purpose which is inexpensive to make and is capable of ready adaptation for forming objects of widely differing shapes and whereas the invention is hereinafter considered only in its applicability to making shapes from edible materials, it is not confined thereto.

With this object in view the improved apparatus comprises a container for plastic material, a perforate wall for said container and means for extruding material from the container through the perforations in the wall at a progressively increasing rate across the breadth of said wall. In use the horizontal wall will preferably be maintained in a substantially horizontal position, though it may be inclined quite sharply, towards the side at which the material is extruded more slowly.

The perforations in the plate preferably take the form of slots arranged either longitudinally, laterally or obliquely to the length of the wall. Such slots should have a substantial width (of the order of ⅛"–¼") and may radiate outwardly from a central aperture of much greater width.

The effect of extruding the material through the perforations at an increasing rate across the width of the wall is to make the individual ribbons of extruded material curl towards the slower side. If there are several such slots the ribbons will tend to roll over on to each other to form a solid shape composed of and still retaining the shape of the individual ribbons. It will readily be appreciated that a variety of different solid shapes can be provided by using perforate walls having different arrangements of slots or other extrusion orifices.

Thus a semicircular orifice with one or more slots radiating therefrom is another form of perforation which finds a use in the present invention.

In apparatus made in accordance with the present invention the perforate wall is made in the form of a stencil plate which can be removed and replaced by other such plates having different arrangement of perforations to allow a variety of different shapes to be produced.

The means employed for extruding the material from the container may be of any convenient form. For example, it may comprise a plate pivotally mounted adjacent one of its edges, the pivotal axis extending parallel and close to one edge of the perforate wall in suchwise that as the plate is rocked about its pivot towards the perforate wall the material is extruded progressively from the perforations.

Owing to the arcuate movement of the plate, the material extruded nearer to the pivot will come out more slowly than the material extruded further from the pivot, with the result that the extruded material tends to curl over towards the pivot.

It is preferable to provide a flat surface on the opposite side of the pivot, on to which the ribbons of extruded material can roll and form into extruded shapes. This surface can either be formed as part of the apparatus or as an extension of the stencil plate, where such is used.

In order that the invention may be more fully understood reference is made to the accompanying drawing wherein:

Figure 1 is a side view of one form of apparatus made in accordance with the invention and intended for use as a kitchen implement for shaping mashed or creamed potatoes, pastry dough and other plastic mixes made from edible substances into various decorative forms.

Figure 2 is a plan view of the implement shown in Figure 1.

Figure 3 illustrates the formation of a shaped object by the use of the implement.

Figures 4 and 5 show other forms of stencil plate.

The implement shown in Figures 1 and 2 comprises a container or body part of part-cylindrical shape having an arcuate wall 1 and sector-shaped ends 2 all formed of sheet metal. The ends 2 are further connected by a cross piece 3, which is attached to a pressed sheet-metal handle 4.

The top edge of the wall 1 is turned over flat for additional strengthening. Likewise the top edges of the ends 2 are turned inwards for strengthening purposes and to act as the bottom part of a slideway, the top part of which is formed by separate angle members 5, which are soldered or otherwise attached to the ends 2.

The slideway referred to is adapted to receive a stencil plate 6, having in the present instance a plurality of longitudinal slots 7 to act as extrusion perforations or orifices, and also having a flat extension surface 8 to receive shapes formed from the material extruded from slots 7. The handle 4 is suitably secured to the container or body part in such manner that its upper surface is adapted to support the flat rear part of the stencil plate 6.

A swinging pressure plate 9, having a top edge rolled round a pivot pin 10 is mounted in the ends at substantially the axis of curvature of the wall 1. The pin 10 is preferably removable to allow the plate 9 to be withdrawn for thorough washing.

The clearance between the plate 9 and the wall 1 and ends 2 is small compared with the width of the slots 7, but the plate need not fit very closely to the wall or to the ends. A stop is provided to prevent the plate 9 swinging further back than the position shown in Figure 1.

The pressure plate is adapted to be moved upwardly by means of a lever 11 pivotally attached to the plate 9 and longitudinally movable of but not connected to the handle 4.

In use the container part is filled with a plastic mix such as creamed potatoes. The stencil plate 6 is then inserted into its slideway and brought into position.

By raising the lever 11 whilst holding the implement substantially level the plate 9 is made to force the mix out through the slots 7. As already explained the ribbons of plastic material tend to curl towards the pivot point. As they curl over, so they also tend to bend under their own weight depending on the consistency of the mix until the leading end of the ribbons contacts the plain part 8 of the stencil plate 6. Further extrusion of the material from the slots 7 will cause the ribbons to roll over in the manner illustrated in Figure 3.

When a shape of the desired size has been formed it may be removed from the plain part 8 by means of a pallet knife, and, when made from creamed potatoes, may then be served or further baked.

It will readily be appreciated that the design of implement shown in the drawing can be further modified without in any way departing from the scope of the invention.

As has already been explained the implement described finds a wide range of application for the forming of shapes from edible plastic mixes, in which may be included creamed potatoes, pastry dough and sugar icing.

What I claim is:

1. A kitchen implement for forming shaped objects from edible plastic material comprising a body part, including an arcuate side wall and sector-shaped end walls attached thereto and a cross member connecting the free ends of said end walls, a perforate wall extending substantially radially of said arcuate body wall, a plate pivotally mounted substantially along the axis of said arcuate wall under said perforate wall, a handle attached to said body cross member and extending substantially in the plane of said perforate wall whereby said perforate wall may be maintained substantially horizontal and a lever pivotally mounted at one end to said pivoted plate, the other end of said lever being free and adapted to be moved longitudinally of the handle to cause arcuate movement of said plate in material extruding direction.

2. A kitchen implement for forming shaped objects from edible plastic material comprising a body of part-cylindrical shape to contain said plastic material, formations on said body forming a slideway substantially radial of and at the top of said body, a perforated stencil plate movable into and out of said slideway, a swinging plate pivotally mounted substantially along the axis of said part-cylindrical body, a handle attached to said body whereby the implement may be grasped to maintain the stencil plate substantially horizontal and a lever pivotally attached to said plate and longitudinally movable of said handle to exert upward pressure on said plate to cause arcuate movement thereof in material extruding direction.

3. A kitchen implement for forming shaped objects from edible plastic material comprising a body of part-cylindrical shape to contain said plastic material, formations on said body forming a slideway substantially radial of and at the top of said body, a perforated stencil plate movable into and out of said slideway, said stencil plate being formed at least with slots of substantial width to act as extrusion orifices, a swinging plate pivotally mounted substantially along the axis of said part-cylindrical body, a handle attached to said body whereby the implement may be grasped to maintain the stencil plate substantially horizontal and a lever pivotally attached to said plate and adapted to be brought into sliding engagement with said handle to exert upward pressure on said plate to cause arcuate movement thereof in material extruding direction.

4. A kitchen implement for forming shaped objects from edible plastic material comprising a body of part-cylindrical shape to contain said plastic material, formations on said body forming a slideway substantially radial of and at the top of said body, a perforated stencil plate movable into and out of said slideway, a swinging plate pivotally mounted substantially along the axis of said part-cylindrical body, a flat imperforate member substantially level with the stencil plate to receive shapes extruded through said plate and arranged on the pivot side thereof, a handle attached to said body whereby the implement may be grasped to maintain the stencil plate and flat member substantially horizontal and a lever pivotally attached to said plate to exert upward pressure on said plate to cause arcuate movement thereof in material extruding direction.

5. A kitchen implement for forming shaped objects from edible plastic material comprising a body of part-cylindrical shape to contain said plastic material, a perforate wall arranged substantially radial of at the top of the body, a swinging pressure plate pivotally mounted substantially along the axis of said part-cylindrical body, and means for exerting upward pressure on said plate to cause arcuate movement thereof in material extruding direction, said perforate wall having a flat imperforate portion lying to one side of the perforated area and extending towards and beyond the pressure plate pivot to act as a receiving surface for shaped objects formed of material extruded through said perforate wall and a handle whereby the implement may be grasped to maintain said perforate wall substantially horizontal.

6. A kitchen implement for forming shaped objects from edible plastic material comprising a body of part-cylindrical shape to contain said plastic material, formations on said body forming a slideway substantially radial of and at the top of said body, a perforated stencil plate movable into and out of said slideway, a swinging plate pivotally mounted substantially along the axis of said part-cylindrical body, said stencil plate having a flat imperforate portion lying to one side of the perforated area and adapted to extend towards and beyond the plate pivot to act as a receiving surface for shaped objects extruded through said stencil plate, a handle attached to said body whereby the implement may be grasped to maintain the stencil plate substantially horizontal and a lever pivotally attached to said plate to exert upward pressure thereon to cause arcuate movement thereof in material extruding direction.

JEAN JOAN WILSON.

References Cited in the file of this patent

UNITED STATES PATENTS

| Number | Name | Date |
|---|---|---|
| 1,399,708 | Ferdon | Dec. 6, 1921 |
| 1,946,238 | Ronzoni | Feb. 6, 1934 |
| 2,496,728 | Laubhan | Feb. 7, 1950 |
| 2,572,960 | Steans | Oct. 30, 1951 |

FOREIGN PATENTS

| Number | Country | Date |
|---|---|---|
| 418,533 | Germany | Sept. 18, 1925 |